United States Patent [19]

Fenner et al.

[11] 3,742,455

[45] June 26, 1973

[54] CENTRAL CONTROL RECEIVER

[75] Inventors: Hans Fenner; Hanspeter Looser, both of Uster, Switzerland

[73] Assignee: Zellweger AG, Uster, Switzerland

[22] Filed: Jan. 20, 1971

[21] Appl. No.: 107,983

[30] Foreign Application Priority Data

Mar. 26, 1970 Switzerland........................ 4601/70

[52] U.S. Cl. .......................... 340/164 R, 340/167 R
[51] Int. Cl. ............................................. H04q 9/00
[58] Field of Search............................ 340/164, 167

[56] References Cited

UNITED STATES PATENTS

| | | | |
|---|---|---|---|
| 3,067,405 | 12/1962 | Hurlimann | 340/164 |
| 3,175,191 | 3/1965 | Cohn | 340/164 |
| 3,387,264 | 6/1968 | Budny | 340/164 X |
| 3,449,719 | 6/1969 | Camarata | 340/164 |
| 3,531,774 | 9/1970 | Baumann | 340/164 B |

*Primary Examiner*—Harold I. Pitts
*Attorney*—Werner W. Kleeman

[57] ABSTRACT

A control receiver for selective evaluation of pulse images characterizing remote control commands. The receiver embodies a bistable switching element shifted no later than at the beginning of a received pulse image into a predetermined second condition of two possible conditions thereof, a switching mechanism associated with the aforementioned bistable switching element compares the received pulse image with at least one pulse image associated with the receiver. The bistable switching element returns to its first condition upon non-coincidence of the received and associated pulse image, whereas upon coincidence thereof and until the end of the pulse image this switching element retains its second condition, and upon interrogation causes the performance of a command. Now, according to important aspects of the present invention the aforementioned switching mechanism embodies a stepping switch, each respective switching position thereof being associated with a respective time interval of the pulse image associated with the central control receiver. Furthermore, the switching mechanism additionally possesses a command coding mechanism coupled with the outputs of the aforementioned stepping switch and with at least one current supply network of the bistable switching element. The conductor arrangement at the command coding mechanism for each of the switching positions, depending upon whether the time interval associated with each such switching position of the pulse image associated with the central control receiver exhibits a pulse interval or a pulse, connects the corresponding output of the stepping switch with a first or second current supply network, whereas on the other hand, no such connection is established if the interval associated with the respective switching position is an interval which is not to be monitored. Additionally, the inventive equipment is manifested by the further features that, by means of the aforementioned switching mechanism and the aforementioned connections only upon non-coincidence of the pulse images which are compared with one another is there present a shunt to the bistable switching element, by means of which there can be removed from the bistable switching element the energy supply required for maintaining its second switching condition or state.

13 Claims, 7 Drawing Figures

United States Patent [19] | [11] 3,742,455
Fenner et al. | [45] June 26, 1973
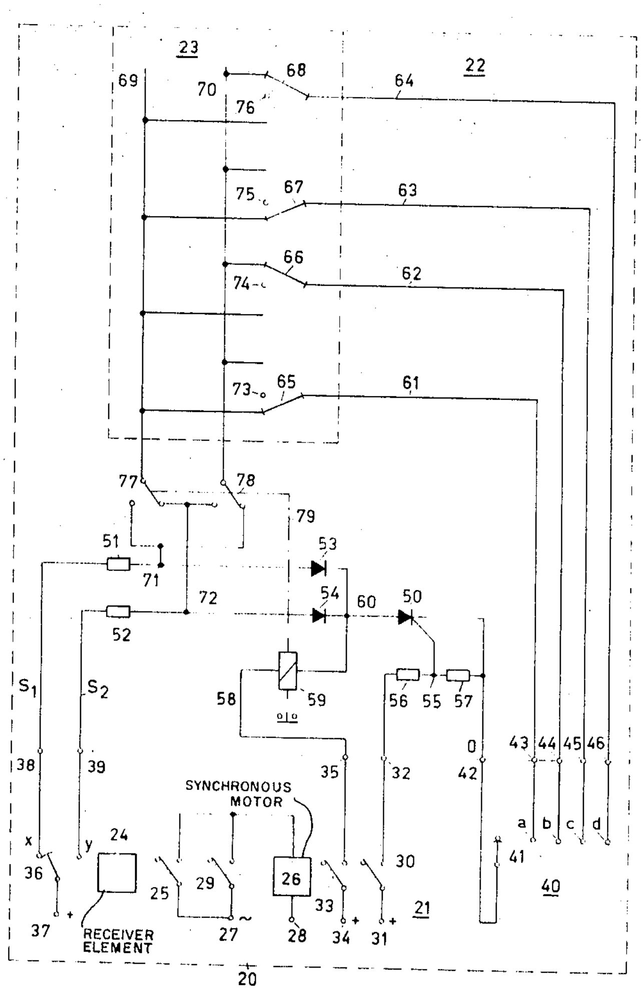

INVENTORS
HANS FENNER
HANSPETER LOOSER
BY
WERNER W. KLEEMAN
ATTORNEY

INVENTORS
HANS FENNER
HANSPETER LOOSER
BY
WERNER W. KLEEMAN
ATTORNEY

INVENTORS
HANS FENNER
HANSPETER LOOSER
BY
WERNER W. KLEEMAN
ATTORNEY

INVENTORS

HANS FENNER

HANSPETER LOOSER

BY

WERNER W. KLEEMAN

ATTORNEY

INVENTORS
HANS FENNER
HANSPETER LOOSER
BY
WERNER W. KLEEMAN
ATTORNEY

INVENTORS
HANS FENNER
HANSPETER LOOSER
BY
WERNER W. KLEEMAN
ATTORNEY

CENTRAL CONTROL RECEIVER

BACKGROUND OF THE INVENTION

The present invention relates to an improved central control receiver for the selective evaluation of pulse images characterizing remote control commands.

The prior art is already familiar with central control receivers for the selective evaluation of pulse images characterizing remote control commands, these images being superimposed upon a high-current power supply network in the form of alternating-current signals. In such type central control receivers there is used a bistable switching element, for instance a controlled semiconductor rectifier, which, no later than at the beginning of a received pulse image is displaced into a given second condition of its two possible states or conditions. For the purpose of comparing a received pulse image with at least one pulse image associated with the central control receiver a switching mechanism is associated with the aforementioned bistable switching element. During the reception of a pulse image the switching mechanism carries out a switching program in accordance with a prescribed rhythm or cycle within a prescribed time interval. To this end, the system is designed in such a fashion that the bistable switching element returns into its first state when there exists noncoincidence of the received and associated pulse images, remaining in this state, whereas upon coincidence such switching element retains its second switching state until termination of the pulse image, and upon interrogation causing performance of a command. Significant in this connection is Swiss Patent No. 430,838.

Additionally, in Swiss Patent No. 462,929 there is described a system which, apart from the evaluation of individual commands, also enables evaluation of so-called collective commands. Finally, it is mentioned that Swiss Patent No. 472,163 teaches a central control receiver for the selective evaluation of pulse images wherein for carrying out eventual further remote control commands there can be operably associated with the basic hardware or system design of the central control receiver one or more groups of channels.

One major drawback of the known physical constructions of central control receivers resides in the fact that the conversion or adjustment of a given control receiver to a different command is cumbersome. This is especially so because to achieve this conversion in the operation of the equipment it is necessary to exchange those movable components of the system hardware which, owing to their interdependency upon a moved switching mechanism, require an exact positioning or adjustment to achieve faultless operation.

SUMMARY OF THE INVENTION

Therefore, a real need still exists in the art of control receivers for the evaluation of pulse images characterizing remote control commands which are not associated with the aforementioned drawbacks of the prior art equipment of this type. Accordingly, a primary object of the present invention is to provide just such type of control receiver equipment which effectively and reliably fulfills the existing need in the art.

Still a further significant object of the present invention relates to the provision of an improved control receiver enabling the conversion thereof to a different command in a relatively simple and easy manner, requiring a minimum of system components and alterations or adjustments thereof.

Another more specific object of the present invention relates to the provision of a novel type of control receiver whereby any possibly required conversion thereof to a different control command, that is, to a different associated pulse image, can be carried out particularly easy, and especially does not necessitate any adjustment or modification of the movable portion of the aforementioned switching mechanism.

Now, in order to implement these and still further objects of the present invention, which will become more readily apparent as the description proceeds, there is provided a central control receiver for the selective evaluation of pulse images characterizing remote control commands, these pulse images being superimposed in the form of alternating-current signals at a heavy-current power supply network. The receiver embodies a bistable switching element shifted no later than at the beginning of a received pulse image into a predetermined second condition or state of two possible conditions thereof, a switching mechanism being associated with the aforementioned bistable switching element for the purpose of comparing the received pulse image with at least one pulse image associated with the receiver. During reception of the pulse image a switching program is carried out with a prescribed rhythm and during a predetermined time-interval, the bistable switching element returning to its first condition upon non-coincidence of the received and associated pulse image and remaining in such first condition, whereas upon coincidence thereof and until the end of the pulse image this switching element retains its second condition or state, and upon interrogation causes the performance of a command. Now, according to important aspects of the present invention the aforementioned switching mechanism embodies a stepping or stage switch, each respective switching position thereof being associated with a respective interval of the pulse image associated with the central control receiver. Furthermore, the switching mechanism additionally possesses a command coding mechanism coupled with the outputs of the aforementioned stage switch and with at least one supply-current network of the bistable switching element. The conductor arrangement at the command coding mechanism for each of the switching positions, depending upon whether the time interval associated with each such switching position of the pulse image associated with the central control receiver exhibits a pulse interval or a pulse, connects the corresponding output of the stepping switch with the first or with the second current supply network, whereas on the other hand, no such connection is established if the interval associated with the respective switching position is an interval which is not to be monitored. Additionally, the inventive equipment is manifested by the further features that, by means of the aforementioned switching mechanism and the aforementioned connections only upon non-coincidence of the pulse images which are compared with one another is there present a shunt to the bistable switching element, by means of which there can be removed from the bistable switching element the energy supply required for maintaining its second switching condition or state.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
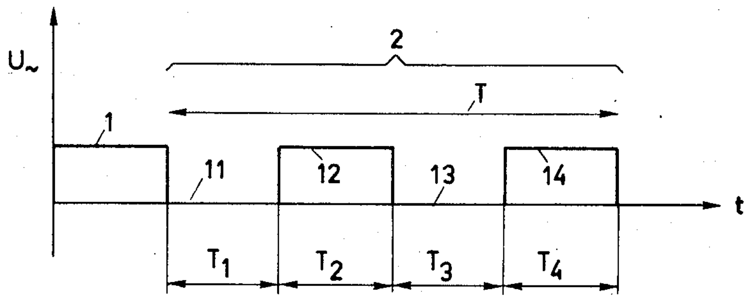
FIG. 1 graphically illustrates a simplified example of a pulse image as a function of time.

Referring now to the drawings, in FIG. 1 there is illustrated a simple example of a pulse image by means of which there can be transmitted a remote control command. Plotted along the abscissa of the graph of FIG. 1 is the time $t$ and along the ordinate the amplitude of the alternating-current signal. This alternating-current signal is superimposed at a high-current power supply network for transmission of the remote control commands. By means of a starting pulse 1 the control receivers arranged at a common high-current power supply network are placed in operation in known manner. Following the starting pulse 1 is the pulse image 2 lasting during the time period T. This time period T is divided into $n$ intervals, whereby in each such interval a pulse or a pulse interval is signalled or marked by a central control transmitter. In the example under consideration the pulse image 2 begins at the time interval $T_1$ in the form of a pulse gap or pulse interval 11, at which there follows a pulse 12 during the time interval $T_2$. During the next time interval $T_3$ there again follows a pulse interval 13, at which follows a pulse 14 during the time interval $T_4$. Quite naturally, it would also be possible to use pulse images possessing a greater number of intervals and complicated sequences of pulse intervals and pulses. In this connection attention is invited to the previously mentioned Swiss Patent No. 430,838. Also, as previously indicated collective commands can be transmitted, as taught by the aforementioned Swiss Patent No. 462,929.

Now, the above-mentioned starting pulse 1 and the pulse image 2 are received by the central control receivers located at the common high-current power supply network, and, the different pulse images 2 then must be selectively evaluated.

Figure 2:
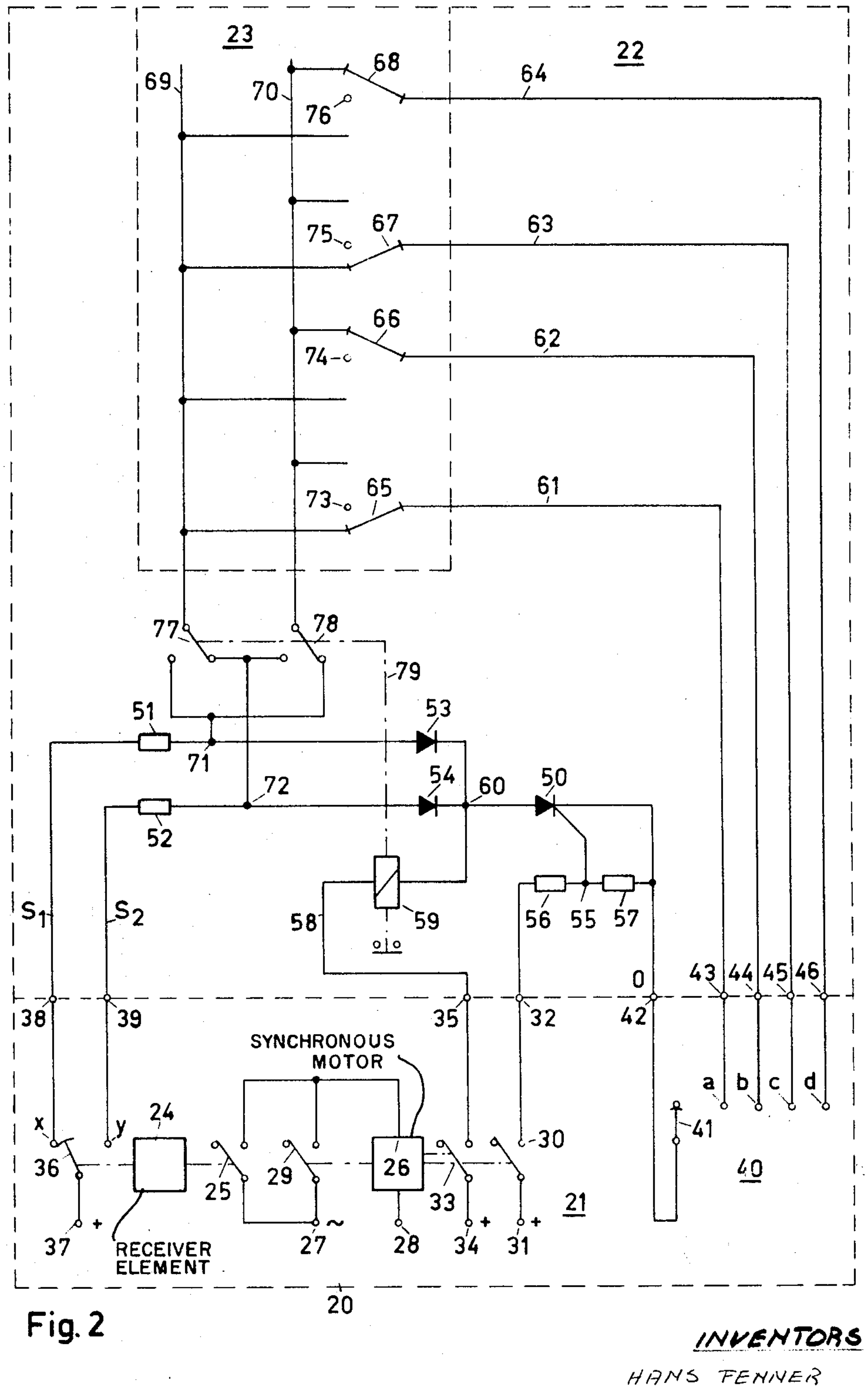
FIG. 2 is a circuit diagram of a first embodiment of inventive central control receiver.

FIG. 2 illustrates a first embodiment of central control receiver 20 suitable for this purpose, this receiver embodying a base switching circuit or base unit 21, a bank or group of channels 22 and a command code arrangement 23.

The base unit 21 contains a receiver element 24 which is well known from the audio-frequency power line carrier control art, which upon reception of a starting pulse 1 (*cf.* FIG. 1) temporarily closes a switch or working contact 25 and thereby, for instance, electrically couples a synchronous motor 26 with an alternating-current voltage supply appearing at the terminals 27 and 28. As a result, the synchronous motor 26 is placed in operation and closes a switch or contact 29 actuated by such synchronous motor, switch 29 remaining in known manner in a self-holding state during the entire time of evaluation of a remote control command. Directly prior to the beginning of the pulse image 2 (*cf.* FIG. 1) the synchronous motor 26 briefly actuates an ignition contact 30, so that a positive voltage is supplied from terminal 31 to terminal 32 of the basic unit 21. Following reception of the pulse image 2 the synchronous motor 26 also actuates an interrogation switch 33, by means of which a positive voltage appearing at terminal 34 is temporarily applied to terminal 35 of the base unit 21.

During the reception of a pulse image 2, again reference being made to FIG. 1 and FIG. 2, the receiver element 24 actuates a reversing or change-over switch 36 in accordance with the received pulse image 2. The change-over or reversing switch 36 thus applies a positive voltage appearing at the terminal 37 to terminal 38 of the basic unit 21 when there is received a pulse interval and if there is received a pulse such change-over switch then applies the positive voltage appearing at the terminal 37 to terminal 39 of the base or basic unit 21. It is here mentioned that the change-over switch 36 advantageously does not operate in interrupted fashion, that is to say, during the switching operation both terminals 38 and 39 temporarily carry a positive voltage.

Furthermore, the basic or base unit 21 is equipped with a stage-selector or stepping switch 40 possessing a contact finger or arm 41 electrically coupled with a terminal 42 which is at null or zero potential. During the time span T′ (FIG. 3) this stepping switch 40 wipingly contacts in sequence the $n$ switching positions $a$, $b$, $c$, $d$. More precisely, the arrangement of the switching positions $a$, $b$, $c$, $d$ is such that the wiping contact of switch position $a$ occurs within the time interval $T'_1$ (see FIG. 3), contact of the switch position $b$ within the time interval $T'_2$, contact of the switch position $c$ within the time interval $T'_3$, and contact of the switch position $d$ occurs within the time interval $T'_4$. Owing to tolerance factors, it is advantageous to design the system such that the contact time for the above-explained switching positions is chosen to be less than the duration of the time intervals $T'_1 ... T'_4$. In the rest position the contact arm or finger 41 of the stepping switch 40 does not assume any of the previously discussed switching positions $a$ ... $d$. By means of the stepping switch 40 the terminals 43, 44, 45 and 46 of the basic unit 21 are each momentarily coupled with the terminal 42 which is at zero potential within each respective time interval $T'_1$ ... $T'_4$.

As will be explained in conjunction with a further embodiment to be considered shortly hereinafter, it is also possible to utilize electronic means to perform the necessary switching functions at the base unit 21.

Figure 3:
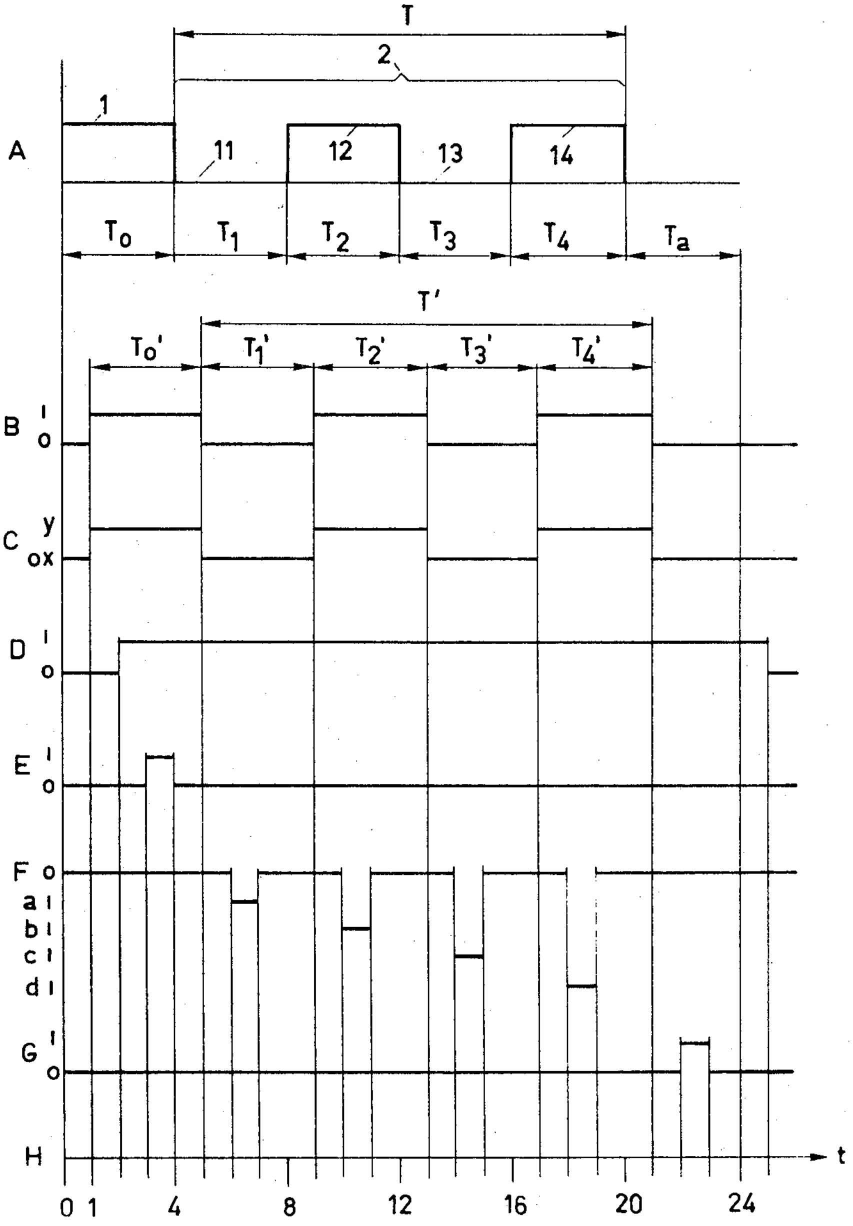
FIG. 3 graphically illustrates the time-course of a switching program of base or basic unit.

FIG. 3 illustrates by way of example a switching program to be realized by the base unit 21, the switching program being depicted in relation to the time course of a transmitted control command, that is, as a function of its starting pulse 1 and its pulse image 2. During a time interval $T_0$, preceeding a pulse image 2 or its time span T, the central control transmitter delivers a starting pulse 1 which is transmitted via the common high-current power supply network to the central control receiver 20. The starting pulse 1 begins at the time period $t_0$ as best observed by referring to line A of FIG. 3. Each of the time intervals $T_0$, $T_1$, $T_2$, $T_3$, $T_4$, as well as a further subsequent time interval $T_n$, are sub-divided into four respective partial time intervals, resulting in a total of 24 such partial time intervals, as best observed by referring to line H of FIG. 3.

The receiver element 24 generally responds with a certain time-delay to the transmitted or received pulse and at the end of a pulse advantageously returns with a time-delay back into its rest condition or state. Consequently, the switch 25 is still closed during the time interval $T_0$ from the time period $t_0$ to the time period $t_1$, reference being particularly invited to line B of FIG. 3. On the other hand, the received starting pulse 1 closes the switch 25 during the time interval $T'_0$ over the time span $t_1$ to $t_5$. At the end of the time interval $T'_0$, that is, at the time period $t_5$, the switch 25 again opens. Since in the assumed illustrative embodiment under consideration, the pulse image 2 during the time interval $T_1$ exhibits a pulse interval 11 the switch 25 remains open during the time interval $T'_1$. Only on account of the pulse 12 transmitted during the time interval $T_2$ does the receiver 24 respond, again with the usual time delay, thus at the time period $t_9$ and holds the switch 25 closed until the time period $t_{13}$. During the time interval $T_3$ there is again marked a pulse interval 13, and accordingly the switch 25 remains open during the entire interval $T'_3$. On the other hand, the receiver 24 responds to the pulse 14 transmitted during the time interval $T_4$, so that the switch 25 is again closed during the period of time indicated by $t_{17}$ to $t_{21}$. Beginning with the time period $t_{21}$ the switch 25 once again opens.

The switch 36 is also controlled by the receiver 24. This switch 36 changes its location from position $x$ to its position $y$, depending upon whether there is marked at the received pulse image a pulse interval or a pulse. In this connection attention is directed to line C of FIG. 3. As already explained, it is advantageous to undertake this switching or change-over without interruption, so that the switching times $t_x$ and $t_y$, if considered exactly, overlap by a certain small amount. As will be later pointed out more fully, the power supply to a bistable semiconductor element provided at the channel bank 22 occurs by means of this switch 36, this semiconductor element, for instance, being a silicon controlled rectifier. In consideration of the required overlapping of the switching times of the switch 36, and the possible still just permissible short interruptions during the switching operation, under these circumstances there is to be taken into account in known manner the extinguishing characteristics of the relevant bistable switching element.

By virtue of the previously explained closing of the switch 25 following reception of a starting pulse the synchronous motor 26 starts-up and brings, for instance, beginning with the time period $t_2$ up to the time period $t_{25}$, the switch 29 into a self-holding condition. This has been graphically represented in line D, FIG. 3.

The switch 30, likewise actuated in accordance with a fixed prescribed program by the synchronous motor 26, closes prior to the beginning of the time interval T, for instance during the time span $t_3 - t_4$. During the remainder of the course of a control command the switch 30 remains open, and in this connection reference is made to line E, FIG. 3.

As already explained, the stepping switch 40 is likewise actuated by the synchronous motor 26. In FIG. 3, line F, there has been graphically depicted the switching function of this stepping switch. Therefore, as will be recognized therefrom, the contact finger or arm 41 of the stepping switch 40 wipingly sequentially contacts, for a short period of time, within each of the time intervals $T_1 - T_4$, a respective one of the switching positions $a$, $b$, $c$, $d$. Consequently, the terminal 43 is coupled with the terminal 42 which is at null or zero potential by means of the contact finger 41 during the time span $t_6 - t_7$. This is similarly the case for the terminal 44 but during the time span $t_{10} - t_{11}$, for the terminal 45 during the time span $t_{14} - t_{15}$, and for the terminal 46 during the time span $t_{18} - t_{19}$.

The interrogation switch 33 is continously open during the starting pulse interval $T_0$ and during the interval T, and is then first temporarily closed, for instance during the time span $t_{22} - t_{23}$, following termination of the pulse image. This has been graphically represented in line G of FIG. 3.

Now, on the basis of the exemplary embodiment depicted in FIG. 2 there will next be considered the construction and mode of operation of a channel bank 22 with a command code arrangement 23.

The channel bank 22 is electrically coupled to the terminals 32, 35, 38, 39, 42, 43, 44, 45 and 46 of the base unit or base switching circuit 21. A bistable switching element 50, for instance a silicon controlled rectifier (SCR), depending upon the position of the switch 36, is supplied with a positive voltage either via the terminal 38 or the terminal 39 through the agency of a respective resistor 51 and 52 and a respective diode 53 and 54. As best seen by referring to FIG. 3, during the time period $t_3$ to $t_4$, at which time the switch 30 is closed, there is briefly delivered a positive voltage serving as the ignition voltage to the ignition terminal 55 of the silicon controlled rectifier, by means of a voltage divider consisting of the resistors 56 and 57. As a result, the silicon controlled rectifier 50 is rendered conductive if it has not previously already assumed such conductive state. Consequently, the bistable switching element 50 conducts current by means of one of both supply-current circuits $S_1$ or $S_2$ from the terminal 38 or 39, depending upon the position of the switch 36, either via the resistor 51 and the diode 53 or via the resistor 52 and the diode 54. Switching element 50 is thus shifted into its second of its two conditions or states. The first condition thereof corresponds to no flow of current, that is, the SCR is extinguished. The cathode of the SCR is coupled with the terminal 42 which is at null potential.

A conductor 58 leads from the terminal 35 of the base unit 21 via a current surge switch 59 to the input side or connection 60 of the bistable switching element 50, that is, to the anode terminal of the SCR. According to FIG. 3, line G, the interrogation switch 33 is first then temporarily closed after completion of the pulse image 2, during the time span from $t_{22}$ to $t_{23}$. During this time period the current surge switch 59 is thus connected, on the one hand, to the positive voltage appearing at the terminal 34 and, on the other hand, to the anode of the SCR 50. If the SCR 50 is then still in its conductive state, then, a current surge flows through the current surge switch 59, whereby it changes or alters its last-assumed position and retains the new position until the next current surge appears. On the other hand, if after termination of the pulse image 2 the SCR is already in an extinguished state, that is no current flows through such SCR, then, notwithstanding the momentary closed condition of the interrogation switch 33 no current surge flows through the current surge switch 59. Consequently, the current surge switch 59 retains the position which it last assumed.

Whether or not the bistable switching element 50 is still in its second switching condition or state or whether it has already shifted back into its first switching condition or state after expiration of the received impulse image is dependent upon the coincidence or non-coincidence (agreement or non-agreement) of the received pulse image and the pulse image associated with the control receiver 20.

Comparison of both pulse images occurs during each of the time intervals $T_1$ to $T_4$ by means of the stepping switch 40 of the basic unit and the therewith coupled lines of conductors 61, 62, 63 and 64, as well as the command code arrangement 23 and its connection to the current supply circuits $S_1$ and $S_2$. The command code arrangement either connects the circuit junction point 71 of the current supply circuit $S_1$ or the circuit junction point 72 of the current supply circuit $S_2$ with the terminal 42 which is at null potential, by means of its conductor connections which are formed by the connection or line sections 65, 66, 67 and 68, as well as the conductors 69 and 70, as a function of the position of the aforementioned connection sections and as a function of the momentary position of the stepping switch 40. During those intervals which should not be monitored as such occurs for collective commands, the corresponding connection sections of the command code or key arrangement 23 are disposed in such a fashion that they are located in a neutral or central position, for instance at locations or terminals 73 or 74 or 75 or 76.

In the exemplary embodiment under consideration the central control receiver 20 should respond to a command which is characterized by the pulse image represented in FIG. 1. Therefore, in this case the connection or conductor sections 65 and 67 must be coupled with the line or conductor 69, because in the associated time intervals $T_1$ and $T_3$ there is expected from the control receiver 20 pulse intervals or gaps owing to the therewith associated pulse image. On the other hand, during the time intervals $T_2$ and $T_4$ pulses are expected from the control receiver 20, for which reason the connection sections 66 and 68 associated with such time intervals must be coupled with the conductor 70. The conductor 69 is selectively connectable via a reversing or change-over switch 77 with the circuit junction 71 of the current supply circuit $S_1$ or with the circuit junction point 72 of the current supply circuit $S_2$. In analogous manner the conductor 70 can be selectively connected by means of the reversing or change-over switch 78 with the circuit junction point 72 of the current supply circuit $S_2$ or with the circuit junction point 71 of the current supply circuit $S_1$. At a later stage in the description of this invention reference will be again made to the function of the reversing switches 77 and 78. Again by referring to FIG. 2, it should be understood that in the illustrated position the conductor 69 is in circuit with the current supply circuit $S_2$ and the conductor 70 with the current supply circuit $S_1$.

Both of the diodes 53 and 54 serve for decoupling or uncoupling both current supply circuits $S_1$ and $S_2$. The current supply circuit $S_1$ is under voltage or energized upon reception of a pulse interval and the current supply circuit $S_2$ is under voltage or energized upon reception of a pulse.

It should now be apparent that with the arrangement of the circuitry of FIG. 2 upon the reception of a pulse image which corresponds to the pulse image associated with the central control receiver 20 — as such pulse image is expressed by the construction of the command code arrangement 23 — there never appears a short-circuit shunt to the current supply circuits $S_1$ and $S_2$ by virtue of the current paths leading to the terminal 42 at null potential from the circuit junction point 71 or 72 via the reversing switch 77 or 78, the conductor 69 and 70 and the associated connection sections 65 ... 68, the conductors 61 ... 64 and the stepping switch 40. The bistable switching element 50 (SCR) is thus never without a supply of current during the entire course of the pulse image; it therefore remains in its second, that is to say, current conducting condition or state.

On the other hand, if a received pulse image does not correspond to the pulse image associated with the central control receiver 20 — which pulse image is expressed by the construction of the command code arrangement 23 — then there is temporarily provided a shunt from the circuit junction point 71 or 72 — depending upon whether the non-coincidence or non-agreement occurs following an expected pulse interval or following an expected pulse — via the reversing switch 77 or 78, the command code arrangement 23, one of the conductors 61 ... 64 and the stepping switch 40 to the terminal 42 which is at null potential. As a result, the bistable switching element 50 (SCR) is at least now briefly without any holding current, so that it falls back into its original non-conductive state and remains in such state until completion of the pulse image.

It is therefore apparent that on the occasion of the interrogation of the condition of the bistable switching element 50 following the completion of the pulse image only the current surge switch 59 is exited and actuated by means of the momentary closing of the switch 33, when the received pulse image corresponds or agrees with the pulse image associated with the control receiver.

Without any essential additional expenditure in hardware the control receiver 20 can be rendered responsive to two commands in a very simple fashion. For instance, it is possible to provide for each pulse image an inverse pulse image, wherein then the pulse intervals and the pulses of the first pulse image always correspond to the momentary pulses and pulse intervals of the second pulse image. It is, for instance, advantageous to associate with one given pulse image an ON-command for the switch which is to be remotely controlled and to associate with the inverse pulse image the OFF-command for such switch. Thus, by means of a simple switching operation, wherein in the embodiment of FIG. 2 there are provided for this purpose the previously mentioned reversing switches 77 and 78, it is possible to adjust the control receiver 20 to the one or the other of both pulse images which are inverse to one another. In this connection it is especially advantageous to couple the reversing switches 77 and 78 with the current surge switch 59, as such has been represented in FIG. 2 by the chain or broken line 79. After each actuation of the current surge switch 59 the control receiver 20 therefore automatically adjusts itself to the momentary inverse pulse image.

Since in the practical utilization of central control receivers the necessity also exists of switching to a different remote control command or to a different pair of remote control commands, it is advantageous to construct the command code arrangement 23 so as to be easily exchangeable. Proposals have already been rendered in the art which concern themselves with the conversion of a certain control receiver to a different remote control command. In this connection reference may be made to Swiss Patent No. 472,163. In so doing, however, there resulted the drawback that it was necessary to replace those elements of the control receiver which were components of a movable mechanism. This, however, is associated with drawbacks both with respect to the maintaining of certain tolerances for the faultless functioning of the mechanism as well as also with regard to the possibility of damaging the movable mechanism during exchange or replacement of the aforementioned elements.

However, the invention renders possible the conversion of the control receiver 20 to a new remote control command or to a new pair of remote control commands without having associated therewith the abovementioned drawbacks. According to FIG. 2 the conductor train determining the pulse image or pulse image pair is contained in the command code arrangement characterized by reference character 23. In the practical embodiment of inventive control receiver the command code arrangement 23 of FIG. 2 is advantageously designed as an exchangeable component.

Figure 4:
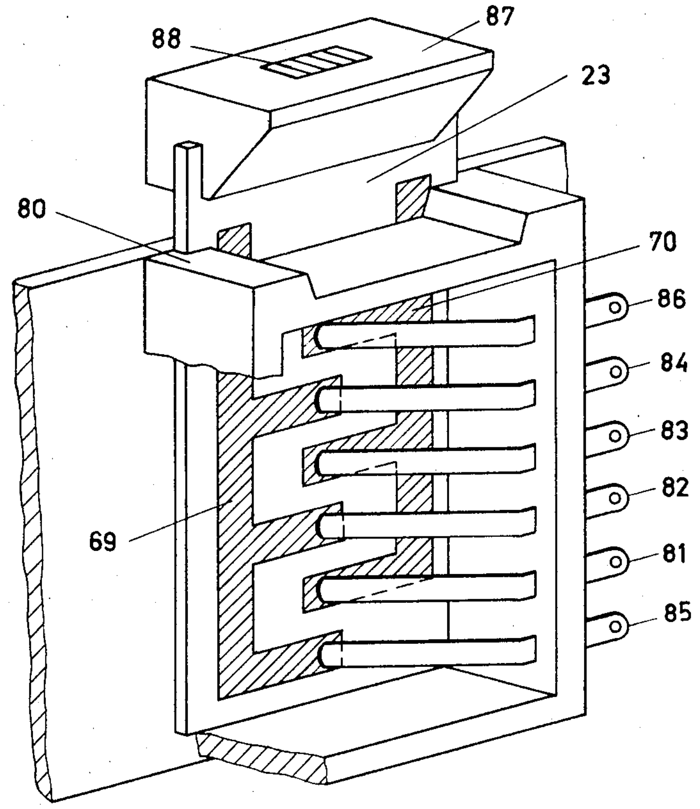
FIG. 4 is an exemplary embodiment of a command code arrangement with associated guide.

This will be readily apparent by referring to FIG. 4 where there is shown one such form of command code arrangement 23 which can be inserted into a block-like guide 80. By means of the contact springs 81, 82, 83, 84, 85 and 86 there is provided on the one hand the connection with the conductors 61 ... 64 and on the other hand the connection from the reversing switches 77 and 78 to the command code arrangement 23. This command code arrangement 23 is thus advantageously fabricated along the lines of a printed circuit. Further, the associated command number, as indicated generally at reference numeral 88, can be depicted at the grip 87.

Figure 5:
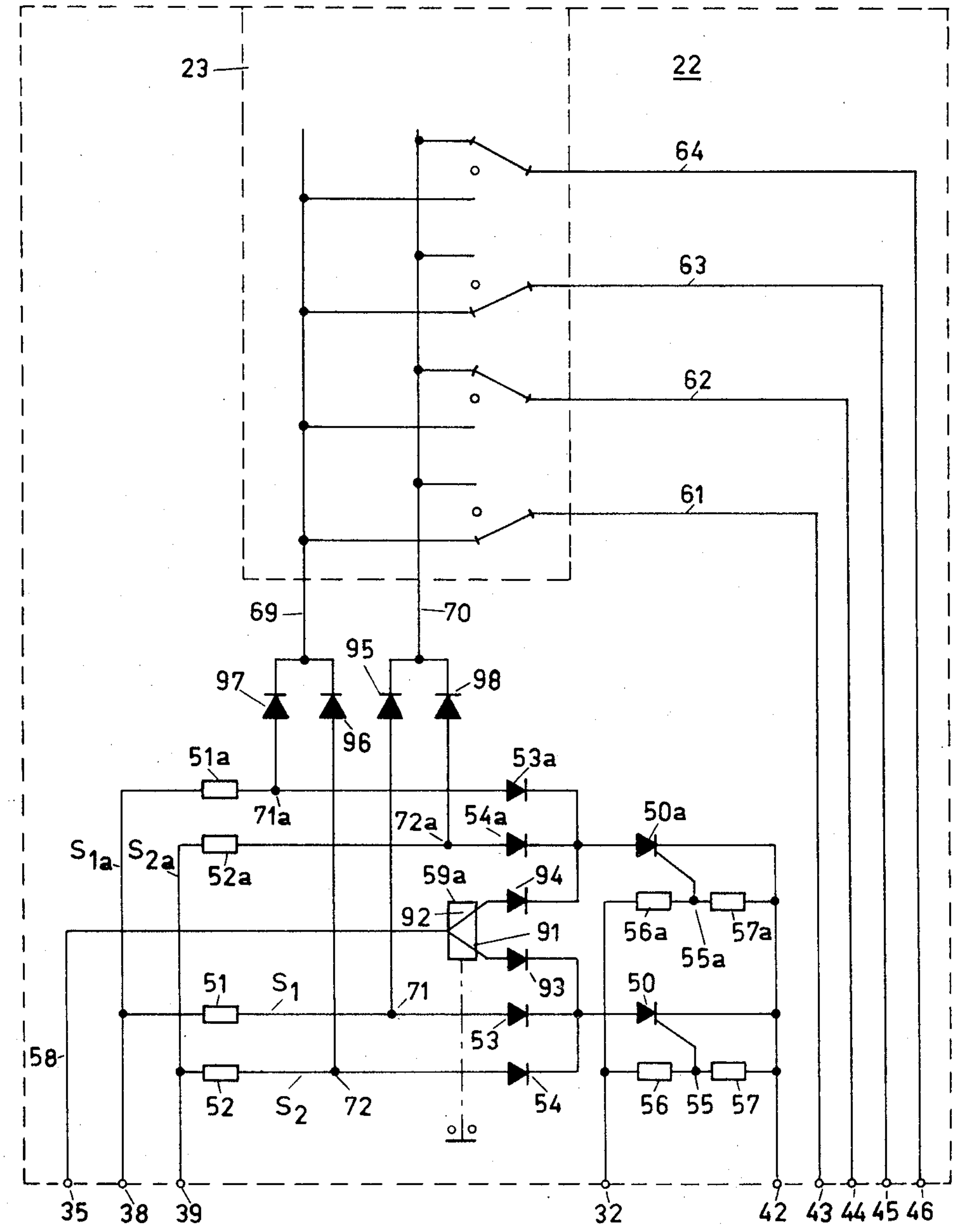
FIG. 5 illustrates details of a further embodiment of a channel group or bank.

FIG. 5 illustrates a further embodiment of a channel bank or group 22. This embodiment differs from that shown in conjunction with FIG. 2 especially in the features that the mechanical reversing or change-over switches 77 and 78 are eliminated. This is possible by carrying out a modification in the circuitry. According to FIG. 5 there is provided an additional bistable switching element **50*a* which in its conductive condition, in the same manner as the previously described switching element 50, draws current upon receipt of a pulse interval, from the terminal 38 via a resistor 51*a*, a diode 53*a*, and upon receipt of a pulse, draws current via the terminal 39 through the agency or a resistor 52*a* and a diode 54*a*. Thus, there are provided for the additional switching element 50*a* two current supply circuits $S_{1a}$ and $S_{2a}$. To simplify the explanation of this particular modification of circuit arrangement, the corresponding components and conductors of the circuitry of FIG. 5 have been conveniently designated with the same reference characters as used for the analogous components in the circuitry of FIG. 2. Moreover, the ignition of the switching element 50*a* occurs in the same manner as ignition of the switching element 50.**

In order to carry out the remote control commands, there is used a bistable current surge switch **59*a* with two windings 91 and 92. As a result, there is provided a current circuit leading from the terminal 35 via the conductor 58, through the winding 91 and a diode 93 to the first bistable switching element 50, and a further current circuit is provided which leads from the terminal 35 via the conductor 58, through the winding 92 and a diode 94 to the further bistable switching element 50*a*. Both diodes 93 and 94** serve to uncouple both of the mentioned current circuits.

The circuit junction point 71 of the current supply circuit $S_1$ is coupled via a diode 95 with the conductor 70 of the command code arrangement 23. The circuit junction point 72 of the current supply circuit $S_2$ is coupled via a diode 96 with the conductor 69 of the command code arrangement 23. A circuit junction point **71*a* of the current supply circuit $S_{1a}$ is coupled via a diode 97 with the conductor 69 of the command code arrangement 23, and a circuit junction point 72*a* of the further current supply circuit $S_{2a}$ is coupled via a diode 98 with the conductor 70 of the command code arrangement 23. Hence, it will be recognized by means of the first mentioned diodes 95 to 98 always the first current supply circuit $S_1$ of the first bistable switching element 50 and the second current supply circuit $S_2$ of the second bistable switching element 50*a* are connected to the conductor 70 of the command code arrangement and, on the other hand, the second current supply circuit $S_2$ of the first bistable switching element 50 and the first current supply circuit $S_{1a}$ of the second bistable switching element is connected to the conductor 69 of the command code arrangement 23.**

There will now be described the mode of operation of a channel bank of FIG. 5 upon receipt of a pulse image according to FIG. 1, whereby the command code arrangement 23 should be similar to that shown in the circuitry of FIG. 2. This mode of operation is as follows:

The received pulse image as well as the pulse image for the ON-command associated with the central control receiver can correspond to the configurations shown graphically in FIG. 1.

Upon completion of the starting operation a positive voltage appears at the terminal 32 during the time period $t_3 - t_4$, as best observed by referring to line E of FIG. 3. Consequently, both of the bistable switching elements 50 and **50*a*** are ignited, that is, placed in a conductive state.

Thereafter the delivery of current to the switching element 50 is never impaired during the time of reception of a pulse image. In other words, there is never formed a shunt to the terminal 42 by means of the command code arrangement 23, conductors 61 to 64 and the stepping switch 40. Therefore, the switching element 50 remains conductive and on the occasion of interrogation, that is when closing the interrogation switch 30, a current surge flows through the winding 91 of the current surge switch **59*a*. The current surge switch 59*a*** therefore performs its ON-command, or, — if it is already located at the ON-position — then it remains in this position.

On the other hand, the bistable switching element **50*a* is already placed into its non-conductive state during the time interval $T'_1$, since upon receiving a pulse interval the holding current flowing via the current circuit $S_{1a}$ to the switching element 50*a*** is removed from such switching element 50*a* via the diode 97, the conductor 69, the command code arrangement 23, the conductor 61 and the stepping or stage switch 40. Hence, this switching element 50*a* is placed into its non-conductive state and it remains in this condition or state until the end.

On the other hand, if the received pulse image is inverse to the showing of FIG. 1, in other words, if the associated remote control command constitutes an OFF-command, then during the reception of this inverse pulse image there is provided in corresponding manner for the switching element 50 a shunt via the command code arrangement. Consequently, the switching element 50 is placed into its non-conductive state. In contrast thereto, in this situation of the inverse pulse image the switching element 50*a* retains its conductive state until the end. Consequently, on the occasion of interrogation that is, during the closing time of the switch 30 a current surge is conducted through the winding 92 of the current surge switch 59*a*. By means of this current surge such current surge switch is shifted into its OFF-position, in the event it has not already assumed such position, and this is done in accordance with the remote control command expressed in the form of the received inverse pulse image.

As already previously explained, it is possible to carry out the switching operations occurring at the basic unit 21 in a purely electronic manner without the use of mechanically moved switches. One embodiment of such type of change-over or reversing switch arrangement 36 of a purely electronic construction has been illustrated in the circuit diagram of FIG. 6.

Figure 6:
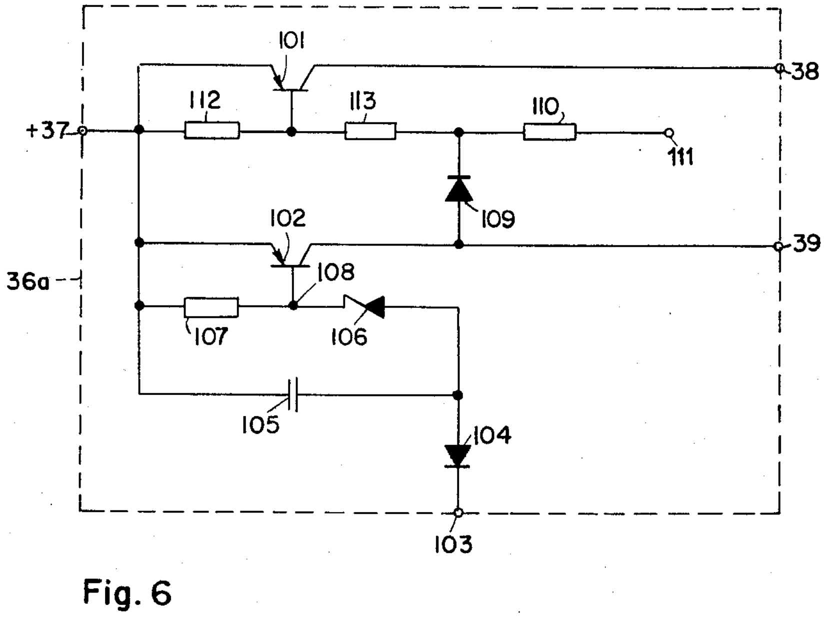
FIG. 6 illustrates details of the circuitry of one form of electronic switching means.

The electronic reversing switch mechanism 36*a* of FIG. 6 fulfills the same functions as the reversing or change-over switch 36 of the circuitry of FIG. 2, or that of FIG. 5. Here this change-over switch mechanism 36*a* will be seen to possess a switching transistor 101 and a switching transistor 102. If the switching transistor 101 is conductive then a positive voltage is supplied from the terminal 37 to the terminal 38. On the other hand, if the switching transistor 102 is conductive, then a positive voltage is supplied from the terminal 37 to the terminal 39. In order to control the switching transistors 101 and 102, there is delivered to the electronic switch mechanism 36*a* an alternating-current pulse at the input terminal 103, which pulse is removed from a non-illustrated filter of the high-current power supply network. A rectifier 104 serves to rectify this alternating-current pulse and thereafter to charge a capacitor 105. As soon as the charging voltage exceeds the Zener voltage of the diode 106, a current flows to a resistor 107 and to the base of terminal 108 of the switching transistor 102. As a result, transistor 102 is rendered conductive, that is, the positive voltage at the terminal 37 is applied to the terminal 39. By means of a diode 109 and a resistor 110 which is coupled to a terminal 111 which is at a negative potential, there thus flows a current. Owing to the voltage drop across the resistor 110 the base-emitter voltage at the switching transistor 101 is reduced to such an extent that this switching transistor 101 is blocked.

If a pulse interval appears at the received pulse image then the alternating-current voltage at the terminal 103 disappears. The switching transistor 102 is therefore blocked. On the other hand, a current flows from the terminal 37 via the resistors 112, 113 and 110 to the terminal 111. This causes the switching transistor 101 to be rendered conductive or fired and therefore a positive voltage is supplied from the terminal 37 to the terminal 38.

Figure 7:
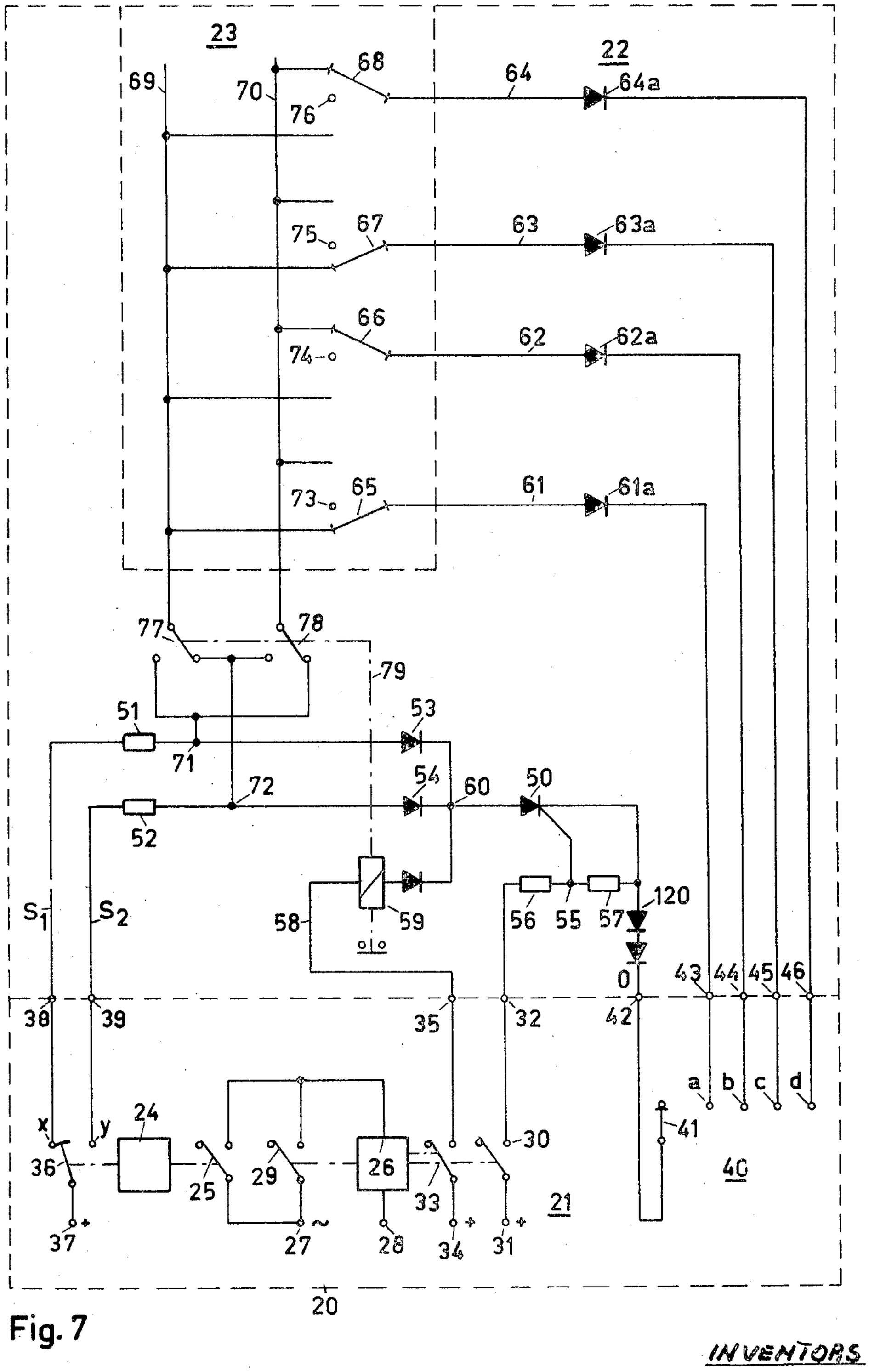
FIG. 7 is a further embodiment of inventive central control receiver.

A further embodiment of the invention is shown in FIG. 7. An advantage of the invention results in the fact that it is also possible to couple a number of channel banks 22 to a single base unit 21 of a central control receiver 20. In such case it is, of course, necessary to decouple the individual channel banks with respect to one another in known manner by diodes 61*a*, 62*a*, 63*a* and 64*a* at the conductors 61, 62, 63 and 64. Each of the channel banks is provided with an individual command code arrangement 23 and therefore responds only to the remote control commands determined by its command code arrangement.

Also, with the type of embodiment shown in the circuit diagram of FIG. 5, it is possible to couple further channel banks 22 to a single basic unit 21, whereby once again, just as was the case with the circuitry of FIG. 7, diodes 61*a* ... 64*a* are provided for decoupling purposes.

It is possible to improve the effectiveness of the shunt connection occurring via the command code arrangement 23, the conductors 61 ... 64 and the stepping switch 40, which is present in the case of non-coincidence or non-agreement of the received impulse image and the pulse image associated with the control receiver 20 or with its channel bank 22, in that between the cathode connection or terminal of the bistable switching element 50 or 50*a* and the terminal 42 there is connected at least one diode 120 in the conductive direction, as specifically shown for instance in FIG. 7.

While there is shown and described present preferred embodiments of the invention, it is to be distinctly understood that the invention is not limited thereto but may be otherwise variously embodied and practiced within the scope of the following claims.

Accordingly, what is claimed is:

1. A control receiver for the selective evaluation of pulse images characterizing remote control commands and which are superimposed at a high-current power supply network in the form of alternating-current signals, said control receiver comprising at least one bistable switching element which no later than the beginning of a received pulse image is placed into one predetermined switching condition of two possible conditions, current supply circuit means for said bistable switching element, a switching mechanism operatively coupled with said bistable switching element for comparing the received pulse image with at least one pulse image associated with the control receiver, said switching mechanism during reception of a pulse image carrying out a switching program in accordance with a predetermined rhythm in a predetermined time span, and wherein the bistable switching element upon non-coincidence of the received and associated pulse images returns and remains in its first condition, while upon coincidence and up to termination of a pulse image retains its second condition and upon interrogation brings about performance of a command, the improvement which comprises said switching mechanism embodying a stepping switch possessing different switching positions, a respective time interval of the pulse image associated with the control receiver being associated with a respective one of said switching positions, said stepping switch having outputs, a changeable command code arrangement which when mounted in a position for programming the control receiver being electrically coupled with said outputs of said stepping switch and with said supply current circuit means of said bistable switching element, said command code arrangement and said stepping switch being separate components, said command code arrangement when mounted in its programming position being stationary, said command code arrangement incorporating a conductor arrangement for each of said switching positions which, depending upon whether the therewith associated time interval of the pulse image associated with the control receiver exhibits a pulse interval or a pulse, connects a corresponding output of said stepping switch with said current supply circuit means while no such connection is established if there is present during the interval associated therewith an interval which is not to be monitored, said switching mechanism and said conductor arrangements of said command code arrangement only upon non-coincidence of the pulse images which are compared with one another providing a shunt connection to said bistable switching element by means of which said bistable switching element has removed therefrom the delivery of energy necessary for the maintenance of its second switching condition.

2. The control receiver is defined in claim 1, wherein said changeable command code arrangement embodies means rendering it exchangeable.

3. The control receiver as defined in claim 1, wherein said command code arrangement is in the form of a printed circuit.

4. The control receiver as defined in claim 1, wherein said current supply circuit means comprises a first current supply circuit, and a second current supply circuit, a terminal leading to a voltage supply with which said first current supply circuit and said second current supply circuit can be selectively coupled, reversing switch means interposed between said terminal and said first current supply circuit and said second current supply circuit, a receiver element for controlling said reversing switch means, said bistable switching element being electrically coupled by said reversing switch means with said first current supply circuit or with said second current supply circuit depending upon whether the received pulse image possesses a pulse interval or pulse.

5. The control receiver as defined in claim 4, further including a reversing switch element shiftable into at least two positions cooperating with said command code arrangement, said command code arrangement being connected via said reversing switch means to said two current supply circuits of said bistable switching element in such a manner that the control receiver in one position of said reversing switch element responds to remote control commands possessing a pulse image determined by said command code arrangement and in the other position of said reversing switch element responds to remote control commands with an inverse pulse image, an interrogation switch electrically coupled with said bistable switching element, a current surge switch coupled with said interrogation switch and with said bistable switching element, said current surge switch further being coupled with said reversing switch element such that upon actuation of said current surge switch said reversing switch element changes its position.

6. The control receiver as defined in claim 1, wherein said current supply circuit means comprises two pairs of current supply circuits, each pair of current supply circuits including a first current supply circuit and a second current supply circuit, a pair of bistable switching elements, each bistable switching element being electrically coupled with one of the pairs of current supply circuits, said conductor arrangement of said command code arrangement including a plurality of conductors, a first diode for electrically coupling said first current supply circuit of said first pair of current supply circuits with a first conductor of said command code arrangement, a second diode for electrically coupling said second current supply circuit of said first pair of current supply circuits with a second conductor of said command code arrangement, a third diode for electrically coupling said first current supply circuit of said second pair of current supply circuits with said second conductor of said command code arrangement, and a fourth diode for electrically coupling said second current supply circuit of said second pair of current supply circuits to said first conductor of said command code arrangement.

7. The control receiver as defined in claim 6, further including current surge switch means electrically coupled with said pair of bistable switching elements, said current surge switch means being equipped with two excitation coils, an interrogation switch for conjointly coupling said two excitation coils with a voltage supply, a respective diode in circuit with each excitation coil for coupling each such excitation coil with a respective one of said pair of bistable switching elements.

8. The control receiver as defined in claim 1, further including a number of channel banks incorporating individual connection lines connected with said switching positions of said stepping switch, and diode means provided for each connection line for uncoupling the individual channel banks with respect to one another.

9. The control receiver as defined in claim 1, further including a terminal which is maintained at null potential, and at least one diode connected in the conductive direction between the cathode terminal of said bistable switching element and said null potential terminal.

10. The control receiver as defined in claim 1, further including electronic switch means in circuit with said current supply means.

11. The control receiver as defined in claim 10, wherein said electronic switch means embodies switching transistors.

12. A control receiver for the selective evaluation of pulse images characterizing remote control commands, comprising at least one bistable switching element capable of assuming two possible switching conditions, means for placing said bistable switching element into one of its predetermined switching conditions no later than at the beginning of a received pulse image, current supply circuit means for said bistable switching element, a switching mechanism coupled with said bistable switching element for comparing the received pulse image with at least one pulse image programmed at the control receiver, said bistable switching element upon non-coincidence of the received and programmed pulse images returning into its first switching condition, while upon coincidence thereof retaining its second switching condition, said switching mechanism embodying a stepping switch possessing different switching positions, an exchangeable stationary command code arrangement for programming the control receiver electrically coupled with said stepping switch and with said supply current circuit means of said bistable switching element, said exchangeable command code arrangement being readily replaceable for a different command code arrangement in order to program the control receiver to be responsive to a different pulse image by simple exchange of said exchangeable command code arrangement, said exchangeable command code arrangement and said stepping switch constituting separate components, said exchangeable command code arrangement incorporating connection means connectable with said stepping switch and said supply current circuit means in an electrical circuit configuration in accordance with the pulse image to be programmed at the control receiver, said switching mechanism and said command code arrangement only upon non-coincidence of the pulse images which are compared with one another providing a shunt connection to said bistable switching element by means of which said bistable switching element no longer is furnished with energy necessary for maintaining its second switching condition.

13. A remote-control receiver for audio-frequency ripple control installations working on the pulse image principle, comprising in combination: an audio-frequency receiving means tuned to a control frequency, said audio-frequency receiving means including a relay having a self-holding contact and a working contact, a synchronous motor connectable with a mains supply for one command period by said self-holding contact and working contact of said relay means upon reception of a starting pulse, semi-conductor means capable of selectively assuming any one of two possible states, means for igniting said semi-conductor means to assume a conductive state no later than the beginning of a received pulse image, circuit means including a shunt circuit arrangement to said semi-conductor means, switching means operated by said synchronous motor as a function of the pulse image to which said control receiver is responsive, said shunt circuit arrangement being closed only upon non-agreement of the received pulse image with the pulse image to which the receiver is responsive, said shunt circuit arrangement embodying two parallel current paths, said switching means comprising a stepping switch driven by said synchronous motor and having separate steps related to each interval of the pulse image, a changeable command code arrangement for programming said control receiver to the pulse image to which it is to be responsive, each step of said stepping switch being connected via said command code arrangement with either or none of said parallel circuit paths as a function of the pulse image to which said control receiver is responsive, said command code arrangement incorporating connection means arranged at said control receiver in a circuit configuration representative of the pulse image to which said control receiver must be responsive, said changeable command code arrangement and said stepping switch comprising separate components, said changeable command code arrangement when in a position programming said control receiver being stationary.

* * * * *